United States Patent [19]
Carter et al.

[11] Patent Number: 5,144,302
[45] Date of Patent: Sep. 1, 1992

[54] MODULAR KEYBOARD

[75] Inventors: Andrew Carter, Saratoga; Troy Hulick, San Jose, both of Calif.

[73] Assignee: Apple Computer, Inc., Cupertino, Calif.

[21] Appl. No.: 667,355

[22] Filed: Mar. 6, 1991

Related U.S. Application Data

[63] Continuation of Ser. No. 333,131, Apr. 4, 1989, abandoned.

[51] Int. Cl.$^5$ .............................................. H05K 5/02
[52] U.S. Cl. ........................................ 341/20; 341/22; 341/23; 340/706; 364/708; 364/709.1
[58] Field of Search ................... 341/22, 23; 340/709, 340/711, 706; 400/472, 486, 492; 364/708, 709.1

[56] References Cited

U.S. PATENT DOCUMENTS

| | | | |
|---|---|---|---|
| 3,499,515 | 3/1970 | Mikrut | 341/22 |
| 3,971,925 | 7/1976 | Wenninger et al. | 341/22 |
| 4,092,527 | 5/1978 | Luecke | 341/22 X |
| 4,326,193 | 4/1982 | Markley et al. | 340/365 |
| 4,333,155 | 6/1982 | Johnston | 364/708 |
| 4,379,336 | 4/1983 | Yamamoto et al. | 364/708 |
| 4,602,138 | 7/1986 | Berutto et al. | 200/340 |
| 4,736,191 | 4/1988 | Matzke et al. | 340/709 X |
| 4,773,090 | 9/1988 | Goatman | 341/23 |
| 4,890,832 | 1/1990 | Komaki | 341/23 X |

FOREIGN PATENT DOCUMENTS

| | | | |
|---|---|---|---|
| 2110163 | 6/1983 | United Kingdom | 400/472 |
| 2154948 | 9/1985 | United Kingdom | 400/472 |
| 8001125 | 5/1980 | World Int. Prop. O. | |

OTHER PUBLICATIONS

"Split Keyboard"; IBM Tech. Discl. Bulletin; vol. 29, No. 7, Dec. 1986.

*Primary Examiner*—Donald J. Yusko
*Assistant Examiner*—Michael Horabik
*Attorney, Agent, or Firm*—Blakely, Sokoloff, Taylor & Zafman

[57] ABSTRACT

A modular keyboard apparatus allowing users to reconfigure the keyboard for their particular applications and convenience. The modular keyboard allows the user to place modules such as alphanumeric keypads, numeric keypads and trackballs into the keyboard housing in positions which are most convenient to the user and to the applications being used. The keyboard can be reconfigured with, for example, a numeric keypad on the right hand side for a right handed user and the numeric keypad on the left hand side for a left handed user. Another example would allow the keyboard to be configured with a trackball assembly instead of the numeric keypad for applications which benefit from use of the trackball over use of the numeric keypad. Apparatus for coupling the various input devices with the keyboard housing assembly are disclosed.

24 Claims, 8 Drawing Sheets

MODULAR KEYBOARD

This is a continuation of application Ser. No. 07/333,131 filed Apr. 4, 1098 of Carter et al, for Modular Keyboard, now abandoned.

BACKGROUND OF THE INVENTION

This invention relates to the field of keyboards, and, more specifically, to the field of keyboards for computer systems.

2. Description of Related Art

With the advent of computer systems, numerous devices have been designed to allow information to be input into these computer systems. Perhaps the most prevalent among these for human speed input has been keyboards.

In today's technology there is often a need for various types of key and non-key input devices which may exist on a keyboard beyond the traditional alphanumeric keypad. As examples, a function key keypad may be required to input function values for certain applications; a numeric keypad for simplified input of numbers may be required for accounting, bookkeeping and other numeric oriented applications; a trackball may be useful for cursor movement; and certain applications may require input by various types of scanning equipment such as optical or magnetic scanners. These are but a few examples of the types of input devices available today. The future certainly holds numerous new devices.

Present keyboards typically are configured in a fixed manner; for example, the alphanumeric typing portion may be on the left hand side of the keyboard and the numeric keypad on the right hand side. This presents several issues.

First, the user who requires a trackball, function key keypad or the like must purchase a separate unit. Numerous examples of such units are available on the market. In addition to the purchase of the separate unit, the user is burdened with the separate unit requiring additional space or his or her desk or workspace. Such add-on devices are even more cumbersome when incorporated as part of portable and lap-top computer systems.

Second, keyboards are often not configured in a manner which is ergonomically proper for a particular user. For example, for a left handed user having a numeric keypad or trackball unit located by his or her left hand may prove to be easier to use and more convenient than having the unit by his or her right hand.

Therefore, it is desirable to develop a keyboard which allows the user to configure the keyboard to his or her own requirements. It is further desirable to develop such a keyboard in a configuration which is easily changeable and reconfigurable as the user moves from one application to another. For example, a particular application may require use of a numeric keypad and another application may benefit from the use of a trackball.

SUMMARY OF THE INVENTION

The present invention discloses a keyboard capable of allowing various input devices to be used. The invention allows the keyboard to be configured by the user in a manner which is most convenient to the particular user and the particular application being executed by the user at a given time. The keyboard of the present invention will accept any of several input devices and will allow the various input devices to be interchanged easily by the user of the system.

As examples, a left handed user may configure a keyboard with the alphanumeric keypad on the right hand side and a trackball on the left hand side. This would allow the user to easily use the trackball with his or her left hand.

The present invention discloses use of tabs and tab holders to position the keypads and hold them in place. In addition, in the illustrated embodiments of the present invention, use of multiple connectors in the keyboard housing allow an alphanumeric keypad and numeric keypad, trackball or other input device to be moved from one position to another.

These and other features of the present invention will be more fully described in the detailed description of the invention.

DETAILED DESCRIPTION OF THE PRESENT INVENTION

A modular keyboard is described. In the following description, numerous specific details are set forth such as dimensions, types of material, etc., in order to provide a thorough understanding of the present invention. It will be obvious however, to one skilled in the art that the present invention may be practiced without these specific details. In other instances, well known structures and circuits have not been shown in detail in order not to unnecessarily obscure the present invention.

OVERVIEW OF THE PRESENT INVENTION

The present invention discloses a keyboard apparatus which allows the user of the keyboard to configure the keyboard for his particular application and convenience. This specification specifically recites certain devices such as alphanumeric keypads, numeric keypads, and trackballs as types of input devices. It will, however, be obvious to one skilled in the art that other types of devices may be substituted.

Figure 1A:
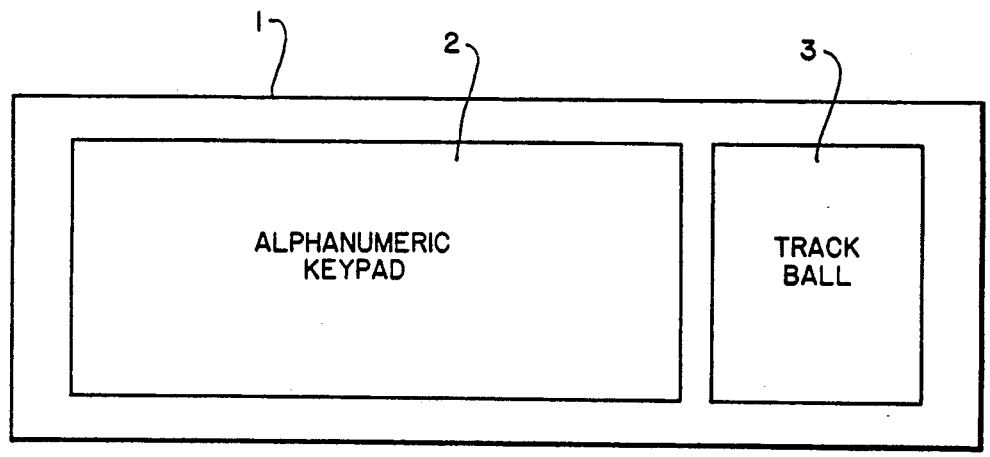
FIG. 1(a) is a block diagram showing an alphanumeric keypad on the left hand side of a keyboard and a trackball on the right hand side of the keyboard in a configuration as may be supported by the present invention.
Figure 1B:
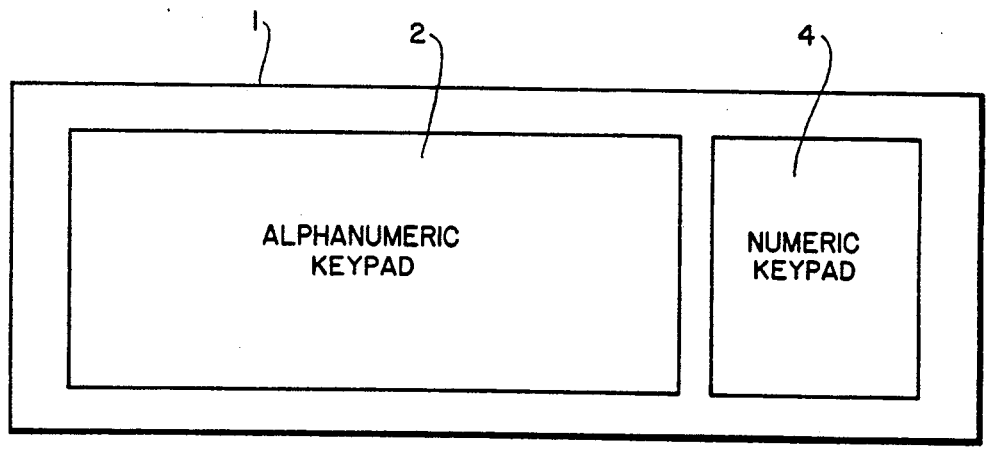
FIG. 1(b) is a block diagram showing an alphanumeric keypad on the left hand side of a keyboard and a numeric keypad on the right hand side in a configuration as may be supported by the present invention.

FIGS. 1(a), 1(b), 1(c) and 1(d) are illustrative of various ways a keyboard may be configured as disclosed by the present invention. For example, referring to FIG. 1(a), a user may configure a keyboard 1 with an alphanumeric keypad 2 on the left hand side of the keyboard 1 and a trackball 3 on the right hand side of the keyboard 1. This configuration may be suited to a right-handed individual using an application which benefits from the use of a trackball. FIG. 1(b) substitutes a numeric keypad 4 for the trackball 3. This configuration may be useful, for example, to a right handed accountant who uses a keypad for inputting data to an application.

Figure 1C:
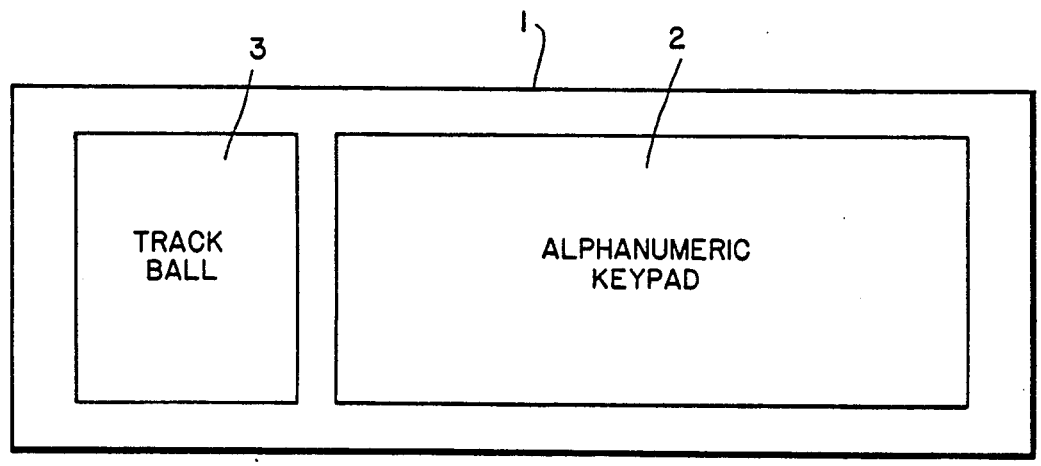
FIG. 1(c) is a block diagram showing a trackball on the left hand side of a keyboard and an alphanumeric keypad on the right hand side in a configuration as may be supported by the present invention.
Figure 1D:
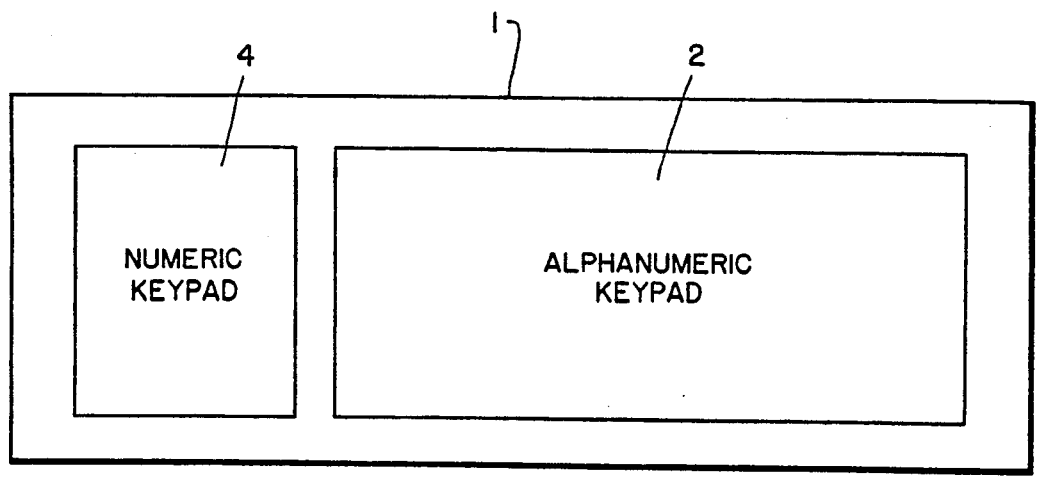
FIG. 1(d) is a block diagram showing a numeric keypad on the left hand side of a keyboard and an alphanumeric keypad on the right hand side in a configuration as may be supported by the present invention.

FIG. 1(c) and FIG. 1(d) illustrate the keyboard 1 configured for the types of applications specified in the descriptions of FIG. 1(a) and FIG. 1(b), respectively. However, the alphanumeric keypad 2 is placed on the right hand side of the keyboard 1 and the alternative input device (i.e. trackball 3 or numeric keypad 4) is placed on the left hand side. This configuration may be useful to a left handed user of the keyboard 1.

Again, it will be obvious to one skilled in the art that other substitutions for the input devices specified are possible. For example, a QWERTY alphanumeric keyboard may be used by one user of the present invention. Another user may instead purchase a Dvorak-style alphanumeric keyboard. Other alternatives would allow use of more than two separate input devices to be placed in the housing.

DESCRIPTION OF A FIRST EMBODIMENT

Figure 2A:
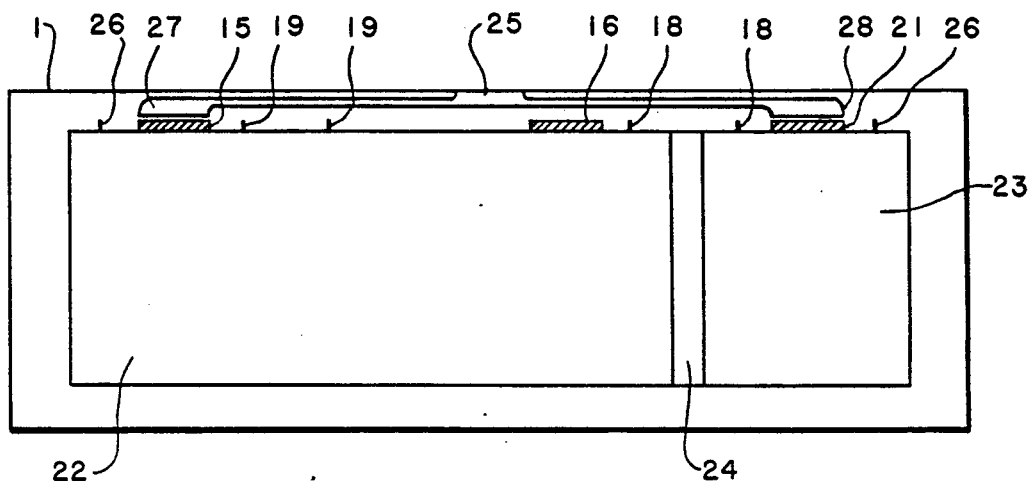
FIGS. 2(a) and 2(b) illustrate two alternatives for assembling a keyboard as disclosed by the present invention.

FIG. 2(a) is illustrative of a first embodiment of a keyboard assembly 1 of the present invention. An alphanumeric keypad 22 may be inserted into the keyboard housing 1 and a 34-pin connector 15 on the alphanumeric keypad 22 may be connected to a cable 25 through a 34-pin connector 27 contained in the housing. A further description of the mechanics of inserting the keyboard 22 into the keyboard housing 1 will follow in the description of FIG. 5.

The keyboard 22 is held in place by tabs 18, 19 and 26 at the top of the keyboard 22 and by tabs (not shown) on the left hand side of the keyboard 22. The cable 25 utilizes two connectors in the first embodiment; connector 27 and connector 28.

A numeric keypad, trackball or similar device 23 may be inserted into the keyboard housing 1 and the 34-pin connector 21 of the device 23 may be connected to the cable 25 through the 34-pin connector 28. Similar to the alphanumeric keypad 22, the device 23 is held in place with tabs 18 and 26 and also by tabs (not shown) on its right hand side.

A spacer 24 is inserted in a gap between alphanumeric keypad 22 and the device 23. Both the spacer 24 and keyboard housing 1 are made of a plastic in the preferred embodiments of the present invention.

When the keyboard is assembled as illustrated in FIG. 2(a), the 34-pin connector 16 of alphanumeric keyboard 22 is not used. In addition, tab holders 19 are not necessary for holding the alphanumeric keypad 22 in place in the configuration illustrated in FIG. 2(a). It will be seen with reference to FIG. 2(b) that both 34-pin connector 16 and tab holders 19 are to be used when the keyboard 1 is assembled in a different manner.

Figure 2B:
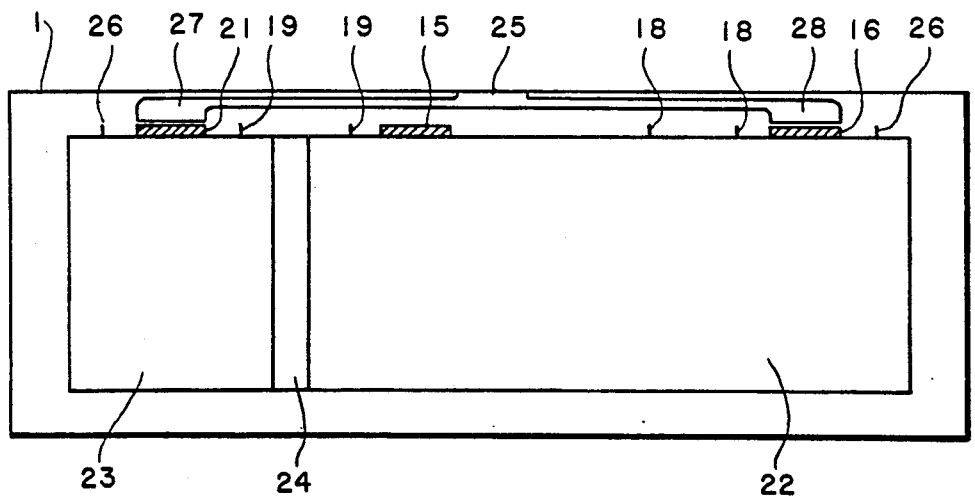

FIG. 2(b) illustrates assembling the keyboard 1 with the alphanumeric keypad 22 on the right hand side of the keyboard 1 and the alternate device 23 on the left hand side. The assembly and connection of the keyboard 1 in this configuration is similar to the assembly and connection as described in FIG. 2(a). However, in this configuration the 34-pin connector 16 is used to couple the alphanumeric keypad 22 to the 34-pin connector 28 in the keyboard housing 1. 34-pin connector 15 and two tab holders 18 are not used in the configuration of FIG. 2(b).

It is obvious to one of ordinary skill in the art that connectors using a different number of pins, or other alternative connection systems may be utilized without departure from the spirit and scope of the present invention. As one particular example, an alternative embodiment may utilize a connection system having three connections per module. Each module in this embodiment comprises an encoding processor for encoding/decoding signals. The encoded signals are communicated with a computer system over the connections. The alternative embodiment offers the advantage of requiring less connector pins lowering manufacturing complexity and costs.

Figure 3A:
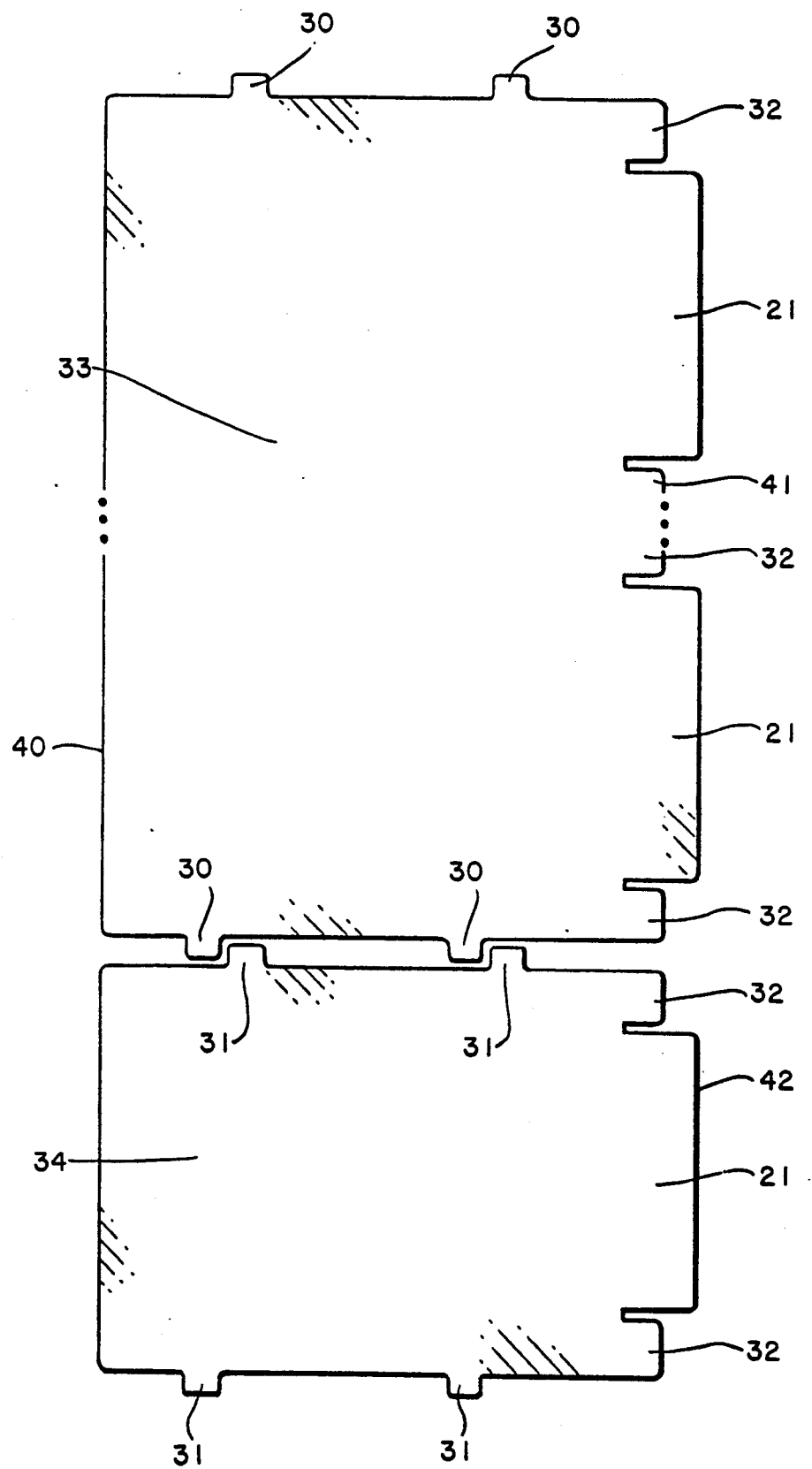
FIG. 3(a) illustrates plates used for holding the various keypads or other input devices as disclosed by the present invention.

FIG. 3(a) illustrates the plates and connectors used for mounting keypads and other input devices in the first embodiment. A plate 33 is used to mount an alphanumeric keypad in the present invention. The plate 33 is made of steel; however, the plate 33 may be constructed, alternatively, of other metals or materials of sufficient strength.

In the first embodiment, the plate 33 measures approximately 275 millimeters in length with two tabs 30 on each side of the plate 33. The tabs 30 measure approximately 4 millimeters by 6 millimeters. The bottom edge of the tabs 30 on the right hand side of the plate 33 are offset approximately 16 millimeters and 66 millimeters, respectively, from the bottom edge 40 of the plate 33. The bottom edge of the tabs 30 on the left hand side are offset approximately 23 millimeters and 73 millimeters, respectively, from the bottom edge 40 of the plate 33. It will be seen that the particular offsets of the tabs 30 allows for proper positioning and alignment of the alphanumeric keyboard in the keyboard housing.

Along the top edge 41 of the plate 33 there are three tabs 32. The first tab 32 is directly on the left edge of the plate 33 and measures approximately 10 millimeters wide. The second tab 32 is in the middle of the plate 33 and measures approximately 145 millimeters in width. The third tab 32 is directly on the right edge of the plate 33 and measures approximately 10 millimeters in width. These tabs 32 are used for coupling with the tab holders 26 shown in FIG. 2(a), FIG. 2(b) and FIG. 5. These tab holders 26 will be further explained in conjunction with FIG. 5.

Further, along the top edge 41 of the plate 33 there are two 34-pin connectors 21. The first of these 34-pin connectors 21 is approximately 10 millimeters from the left had side of the plate 33 and measures approximately 37 millimeters in width. The second 34-pin connector 21 is approximately 210 millimeters from the left hand edge of the plate 33 and also measures 37 millimeters in width.

Still referring to FIG. 3(a), a plate 34 used to mount an alternate input device, such as a numeric keypad, track ball, etc. The plate 34 is approximately 75 millimeters in width and also has two tabs 31 along each of its edges. The tabs 31 are offset the same distance from the edge of plate 34, and are of the same dimensions, as the tabs 30 described for the plate 33. By offsetting the tabs at the same offsets as for plate 33, the tabs of the respective plates may be aligned and caused to slightly overlap as shown in FIG. 3(a).

Along the top edge 42 of the plate 34 there are two tabs 32, each measuring approximately 10 millimeters in width. These tabs 32 are directly along the left and right edge respectively of the plate 34. Centered between the tabs 32 approximately 10 millimeters from each edge of the plate 34 is a 34-pin connector 21 measuring 37 millimeters in width.

Figure 3B:
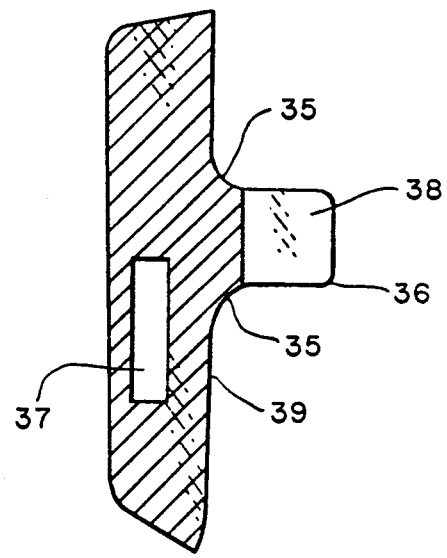
FIG. 3(b) illustrates a tab as used on the plates as disclosed in the present invention.

FIG. 3(b) is further illustrative of the tabs along the side edges of the plates 33 and 34. Plate 33 and plate 34 are coated with an insulative material. The coated area 39 extends out to the beginning of the tab 36 as illustrated in FIG. 3(b). The coating does not extend onto the tab 36 leaving an uncoated area 38. This uncoated area 38 provides Electromagtec Compatibility (EMC) grounding when the plates 33 and 34 are inserted into electrically conductive mountings in the keyboard housing 1. Along the edge of the plates 33 and 34 are holes 37 used for connecting the plates 33 and 34 to the printed circuit boards used in the keyboard assemblies.

The present invention discloses use of rounded corners 35 which increase the strength of the tabs 36 in supporting the keyboard assemblies. These rounded corners 35 are especially important where the holes 37 occur close to the tabs 36. In such cases the amount of metal between the holes 37 and the edge of the plate 33 or 34 is minimal. The rounded corners 35 tend to decrease the local mechanical stress making the assembly more resistant to environmental stresses of shock and vibration. This strength is especially important in a keyboard which is designed to allow easy and frequent assembly and disassembly by a user.

Figure 5:
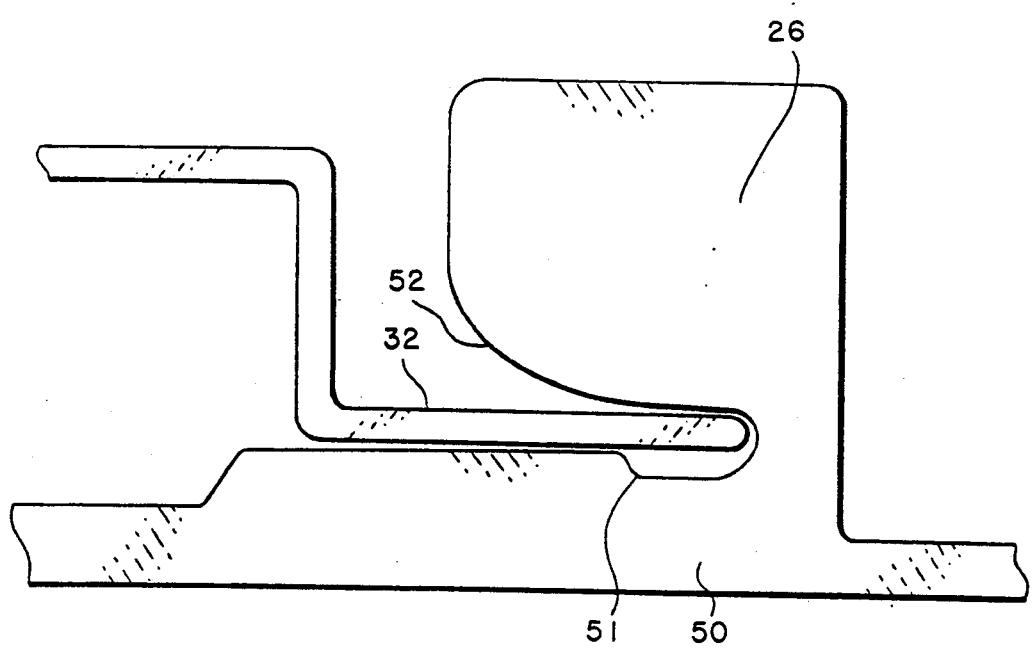
FIG. 5 illustrates a tab holder as disclosed by the present invention.

FIG. 5 illustrates a tab holder 26. The tab holder 26 is built into the base of the keyboard housing 50. The top tabs 32 on the alphanumeric keypad, trackball or numeric keypad may be fitted into the tab holder 26. The tab holder 26 is designed with a curved area 52 and a lip 51 which assist in the alignment of the top tabs when inserting the keypad or other device 32.

When inserting an alphanumeric keypad, trackball or numeric keypad into the keyboard housing assembly, the keypad unit is inserted at an angle such that the tab 32 moves into the tab holder 26 around the curved edge 52 and slides into the lip 51. The combination of this curved edge 52 and the lip area 51 eases the movement of the keypad in the tab holder.

After the keypad is inserted into the tab holders 26, the keypad is shifted slightly either to the left or the right in order to insert the side tabs into the keyboard housing. If the keyboard is placed into the left hand side of the keyboard housing it will be shifted to the left and the tabs on its left hand side are used for support and stability in the keyboard housing. Likewise, if the keyboard unit is inserted into the right hand side of the keyboard housing it is shifted slightly to the right and the tabs on the right hand side of the keyboard are inserted into the keyboard housing. This means, for example, the right side tabs on the keypad in the left side of the keyboard assembly are not used and the left tabs on the keypad in the right side of the keyboard assembly housing are not used.

After the two modules have been inserted and slid to their respective sides of the housing, a spacer is inserted between the modules. The spacer holds the unused tabs of the modules in place and allows the assembled keyboard to have a finished look, while retaining the flexibility and modularity described.

Figure 4:
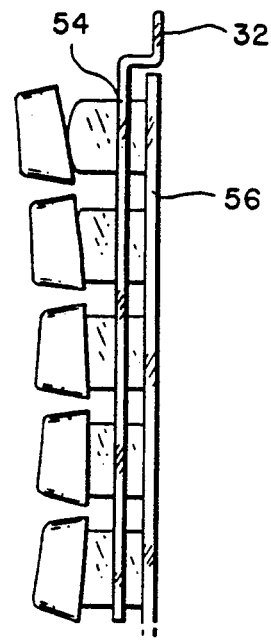
FIG. 4 illustrates a profile view of a keypad as used by the present invention.

FIG. 4 is illustrative of the keyboard assembly including a plate 54 and the top tabs 32. This figure shows the printed circuit board 56 with keys mounted on it mounted in the plate 54. Plate 54 corresponds to plate 33 of FIG. 3(a). Mounting of an alternate input device on plate 34 of FIG. 3(a) is similar.

MAPPING OF KEYS AND INPUT SIGNALS

Figure 6B:
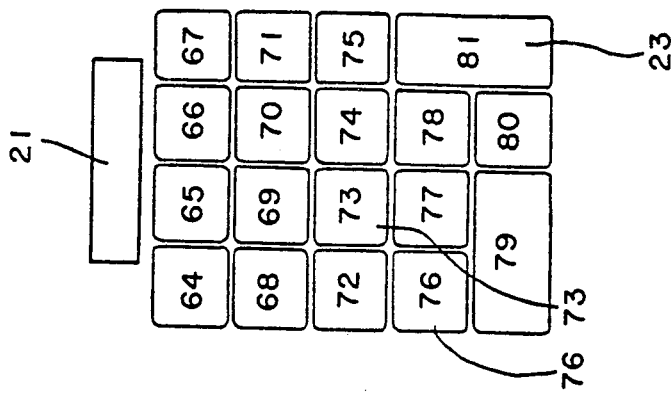
FIG. 6(a) and FIG. 6(b) typical keypads as used by the present invention.
Figure 6A:
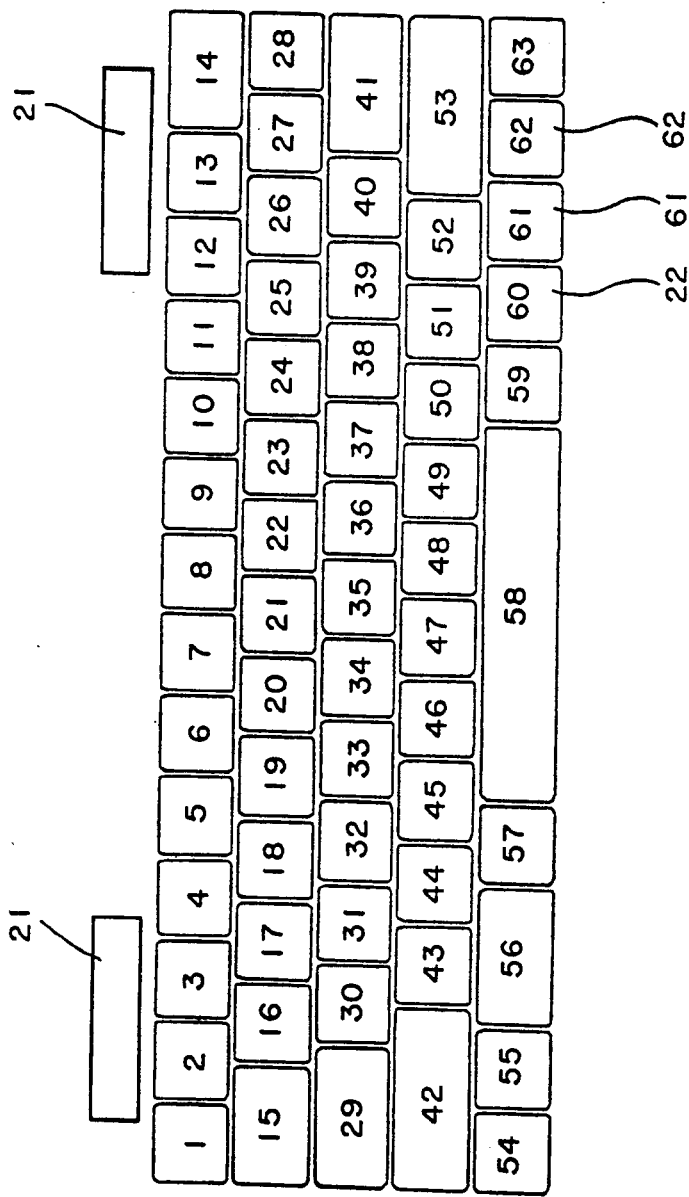
Figure 7:
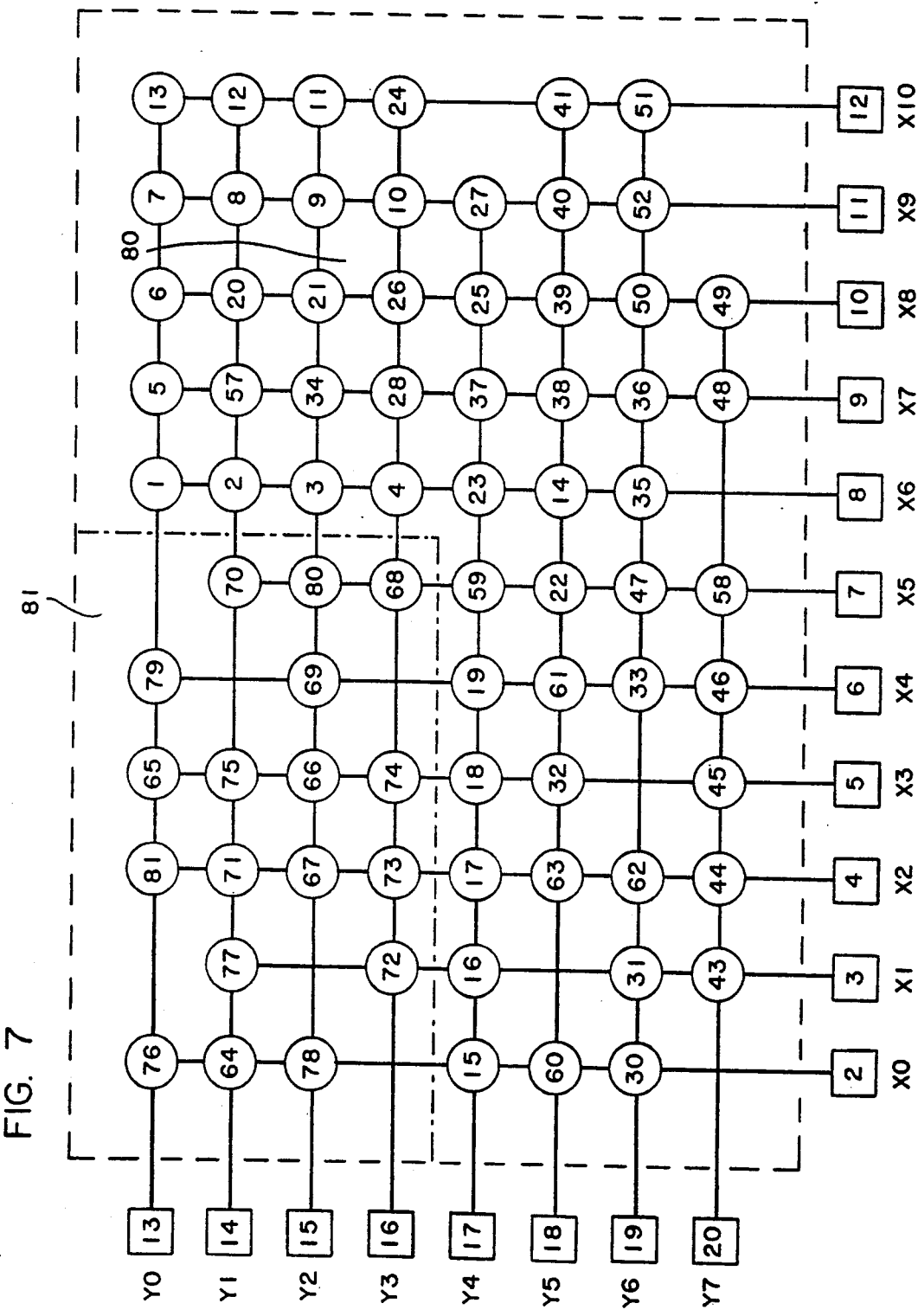
FIG. 7 illustrates mapping of the keys on the keypads into a scanning matrix as disclosed by the present invention.

FIG. 6(a), FIG. 6(b), and FIG. 7 are illustrative of the relationship between the keys and the keyboards and the wiring connecting the keyboard to the computer system, as used in the first embodiment of the present invention.

FIG. 6(a) illustrates an alphanumeric keypad 22. FIG. 6(b) illustrates a numeric keypad 23. The two keypads, alphanumeric keypad 22 and numeric keypad 23, are coupled with the cabling in the keyboard housing (illustrated in FIGS. 2(a) and 2(b)) through the 34-pin connectors 21. Table I below illustrates the pin assignments in these 34 pin connectors 21.

TABLE I

| PIN # | ASSIGNMENT |
|---|---|
| 1 | Ground 3 |
| 2 | X0 |
| 3 | X1 |
| 4 | X2 |
| 5 | X3 |
| 6 | X4 |
| 7 | X5 |
| 8 | X6 |
| 9 | X7 |
| 10 | X8 |
| 11 | X9 |
| 12 | X10 |
| 13 | Y0 |
| 14 | Y1 |
| 15 | Y2 |
| 16 | Y3 |
| 17 | Y4 |
| 18 | Y5 |
| 19 | Y6 |
| 20 | Y7 |
| 21 | CAPS LOCK |
| 22 | SHIFT |
| 23 | CONTROL |
| 24 | OPTION |
| 25 | COMMAND |
| 26 | GROUND 1 |
| 27 | GROUND 2 |
| 28 | +5V |
| 29 | ADB DATA |
| 30 | BUTTON |
| 31 | SPARE |
| 32 | SPARE |
| 33 | SPARE |
| 34 | GROUND 3 |

FIG. 7 further illustrates the electrical coupling of the keypads 22 and 23 with specific reference to keys 61, 62, 73 and 76 shown in FIGS. 6(a) and 6(b). It will be obvious that the particular keys discussed with reference to FIG. 7 are merely exemplary and signal processing of the remaining keys of keypads 22 and 23 is similar.

Referring now to FIG. 7 when a user depresses key 61 for example, it is detected at the intersection of X4 and Y5. When key 62 is depressed it is detected at the intersection of X2 and Y6. Methods of developing circuits for such keyboards are well known in the prior art, however, several inventive features of the present invention require discussion. The present invention in its first embodiment has divided the X-Y matrix into two areas. Area 81, which includes the intersection of X0-X5 with Y0-Y3, is reserved for use by the alternate input device. The alphanumeric keyboard uses the remainder of the X-Y matrix, area 80.

Using this convention, the alphanumeric keyboard and the alternate input device may be freely switched between the 34-pin connectors in the keyboard housing. For example, depressing key 76 shown in FIG. 6(b) will activate the X0-Y0 intersection, regardless of which 34-pin connector the numeric keypad is coupled with in the keyboard housing assembly. Likewise, depressing key 73 will be detected at the intersection of X2 and Y3, again, regardless of which 34-pin connector the numeric keypad is coupled with the keyboard housing.

Other alternate input devices may use only a subset of the signals available in area 81; however, the basic concept of definition and separation of signals received from the alphanumeric keypad and the alternate input device remains.

DISCUSSION OF ALTERNATIVE EMBODIMENTS

Many alternatives are available to the first embodiment of the present invention. For example, use of screws instead of the tabs and tab holders as disclosed by the present invention would be obvious to one with ordinary skill in the art. The user of the keyboard could interchange keypads by unscrewing the existing keypad and screwing in a new keypad. Alternatively, the various input devices could be mounted into the keyboard housing after removing the top of the housing and fastening the input device to the housing. The top of the housing could then be replaced. The use of tabs as disclosed by the present invention offers the advantage of not requiring tools in order to interchange keypad assemblies.

DESCRIPTION OF A SECOND EMBODIMENT OF THE PRESENT INVENTION

Figure 8:
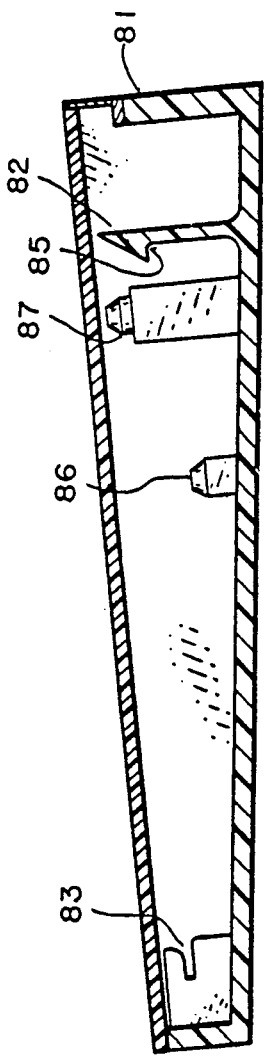
FIG. 8 is a cut-away side view of a second embodiment of the keyboard of the present invention.

A second embodiment of the present invention is described with reference to FIGS. 8 and 9. FIG. 8 illustrates a side-view of a keyboard housing 81 of a second embodiment of the present invention. The keyboard housing 81 comprises a plurality of barb snaps 82 and a plurality of capture ribs 83. Preferably, the second embodiment comprises six barb snaps 82 centered 20.6, 84, 104, 284, 304 and 367.4 mm from the left edge of the keyboard housing 81. Each of the six barb snaps 82 are centered 145 mm from the bottom edge of the keyboard housing 81.

In the second embodiment, there are preferably eight capture ribs spaced 16.1, 82.9, 99.5, 166.3, 216.1, 282,9, 299.5 and 366.3 mm from the left edge of the keyboard housing 81.

The keyboard housing 81 further comprises a plurality of stepped post supports 87 and pins 86. The stepped post supports 87 provide support for keypads, when the keypads are inserted in the keyboard housing 81. Preferably, there exists six supports 87 on the same centers as barb snaps 82 from the left edge of the keyboard housing and centered 124.8 mm from the bottom edge of the keyboard housing. In addition, there are preferably two pins centered 96 mm from the bottom and 94 and 294 mm from the left edge of the keyboard housing 81.

A keypad, such as an alphanumeric keypad may be inserted into the left (or alternatively into the right) side of the housing by placing the bottom edge of the keypad into capture ribs 83 and pressing the top edge of the keypad into the barb snaps 82. Support for the keypad is provided by step post supports 87. The spacing of the barb snaps 82, stepped post supports 87 and capture ribs 83 is designed to allow the an alphanumeric keypad to be inserted into either the left or right- hand side of the keyboard housing 81 while allowing an alternate input device to be inserted into the opposite side.

Figure 9:
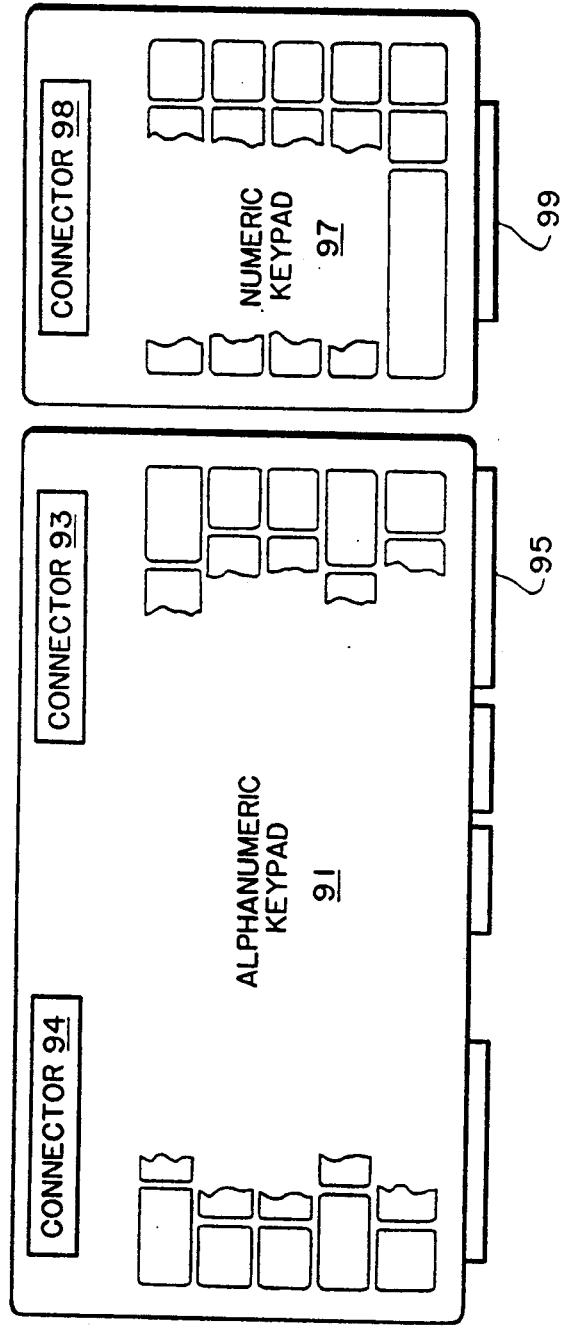
FIG. 9 is a top-view of an alphanumeric keyboard and numeric keyboard of a second embodiment of the present invention shown in relation to one another.

Referring now to FIG. 9, a top-view of an alphanumeric keypad 91 and a numeric keypad 97 as may be utilized by the present invention is shown.

The alphanumeric keypad 91 comprises a plurality of keys 92, preferably of either the QWERTY or Dvorak style. In addition, the alphanumeric keypad 91 may comprise characters from any number of languages. The alphanumeric keypad 91 further comprises two 34-pin connectors, 93 and 94. Depending on whether the alphanumeric keypad is placed in the right or the left side of the keyboard housing, the keypad 91 is coupled through either the right connector 93 or left connector 94 for providing signals to a computer system. The keypad further comprises a plurality of tabs 95 for coupling with capture ribs 83 illustrated in FIG. 8.

The numeric keypad 97 comprises a single connector 98. If the numeric keypad 98 is inserted in the right side of the keyboard housing, the connector 98 is preferably coupled to a corresponding connector in the right side of the keyboard housing. Likewise, if the numeric keypad 98 is inserted in the left side of the keyboard housing, the connector 98 is preferably coupled to a corresponding connector in left side of the keyboard housing. The numeric keypad 97 further comprises tab 99 for coupling with capture ribs 83 of FIG. 8.

It will be obvious that the keyboard of the present invention may be easily adapted to allow use of alternate sized input devices. For example, one alternative embodiment utilizes two modules of approximately equal width; each one of the two modules being approximately equal to one-half of the combined width of the alphanumeric keypad 91 and the numeric keypad 97. One particular application of such modules would utilize a graphics tablet located in one-half of the keyboard housing and a companion control button or miniature keyboard module in the other half.

Thus, a modular keyboard apparatus is disclosed. The user of the keyboard may easily interchange input devices mounted in the keyboard in order to configure the keyboard for his particular applications and preferences.

What is claimed is:

1. A computer system having a modular keyboard apparatus, said modular keyboard apparatus comprising;

a keyboard housing assembly with an opening for coupling a first modular input device and a second modular input device in a first or a second configuration;

said first modular input device having a plurality of tabs for coupling with said keyboard housing assembly and a first connector for providing a plurality of different input signals;

said second modular input device having a plurality of tabs for coupling with said keyboard housing assembly and at least two first connectors for providing a plurality of different input signals;

said keyboard housing assembly having at least two second connectors for coupling with one of said first connectors of each of said first modular input device and said second modular input device, so that when said first modular input device and said second modular input device, so that when said first modular input device and said second modular input device are in said first configuration, said first connector of said first modular input device is coupled to a first of said at least two second connectors and a first of said at least two of said first connectors of said second modular input device is coupled to a second of said at least two second connectors, said keyboard housing assembly further comprising a third connector, said third connector coupled to said at least two second connectors and said computer system.

2. The modular keyboard, as recited in claim 1, wherein each said modular input device comprises:
an input means;
a printed circuit board, said printed circuit board for coupling with said input means;
said printed circuit board detecting inputs from said input means and generating signals based on said inputs;
a plate, said plate for coupling with said printed circuit board;
said plate having tabs on its left and its right sides and along its top edges for coupling with said keyboard housing.

3. A modular keyboard, as recited in claim 2, wherein said keyboard housing further comprises:
a molded assembly coupled with said keyboard housing;
said molded assembly having a curved area and a lip, said curved area and said lip for providing alignment for said tabs when each of said modular input devices are coupled with said keyboard housing.

4. The modular keyboard apparatus, as recited by claim 3, wherein:
said first connector comprises 34 electrical contacts for communication of signals;
said one or more second connectors each comprise 34 electrical contacts for communication of signals;
said first connector positioned on said first modular input device such that said first modular input device may be coupled with said keyboard housing in any of a plurality of positions within the opening provided for said modular input devices;
said first connector being aligned with one of said second connectors.

5. A modular keyboard apparatus, as recited in claim 4, wherein;
said third connector coupled with a cable for communication of signals with said computer system;
said cable having therein a plurality of wires, each said wire being coupled with an electrical path of said third connector, said electrical path coupled with each one of said contacts said first connector.

6. A modular keyboard apparatus, as recited in claim 5, wherein each of said modular input devices comprise one of alphanumeric keypad, numberic keypad, or trackball device.

7. The modular keyboard as recited in claim 1 wherein when said said first modular input device and said second modular input device are in said second configuration, said first connector of said first modular input device is coupled to said second of said at least two second connectors and a second of said at least two of said first connectors of said second modular input device is coupled to first of said at least two second connectors.

8. In a keyboard assembly having a plurality of input devices, the keyboard assembly coupled with a computer system for providing signals to the computer system, an improvement comprising:
a keyboard housing assembly with an opening for coupling with at least a first modular input device and a second modular input device, said keyboard housing assembly providing for coupling said first modular input device on a first or a second side of said second modular input device;
said keyboard housing assembly having therein a plurality of tab holders;
said tab holders being coupled with said keyboard housing and having a rounded edge and a lip;
said rounded edge and said lip for providing alignment for said modular input devices when said modular input devices are inserted into said opening;
said keyboard housing assembly further having a plurality of first connectors for connecting with said modular input devices, said plurality of first connectors for communication of signals with said modular input devices, and a third connector coupled to said plurality of first connectors and said computer system;
said first and second modular input devices each having input means capable of providing a plurality of different input signals, a printed circuit board for coupling said input means, a plate for coupling with said printed circuit board, tabs along the top side of said plate for coupling with said tab holders, tabs along the right and along the left side of said plate or coupling with said keyboard housing assembly;
said first modular input device having a second connector for coupling with one of said first connectors;

9. The improvement, as recited in claim 8, wherein:
said keyboard housing assembly has two of said first connectors;
one of said first connectors on the right side of said keyboard housing assembly and a second of said first connectors on the left side of said keyboard housing assembly.

10. The improvement, as recited in claim 9, wherein said second modular input device comprises:
an alphanumeric keypad;
said alphanumeric keypad having a plurality of alphanumeric keys;
a printed circuit board for coupling with said alphanumeric keys;
a plate for coupling with said printed circuit board;
said plate having therein holes for coupling with said keyboard housing apparatus;

said plate having said at least two second connectors which include a right side connector on its right side and having a left side connector on its left side;

said right side connector for coupling with one of said first connectors in said keyboard housing apparatus when said alphanumeric keypad is coupled to said opening of said keyboard housing apparatus in the right side of said opening;

said left side connector for coupling with said first connector in said keyboard housing when said alphanumeric keypad is coupled to said opening of said keyboard housing apparatus on the left side of said opening;

connector and said left side connector said right side providing identical signals when one of said alphanumeric keys are depressed.

11. In the improvement, as recited in claim 9, said first modular input device comprising;
a numeric keypad;
said numeric keypad having a plurality of numeric and operator keys;
a printed circuit board for coupling with said plurality of keys;
a plate for coupling with said printed circuit board;
said plate having therein holes for coupling with said keyboard housing apparatus;
said plate having said second connector in the top center of said plate;
said second connector for coupling with one of said first connectors in said keyboard housing on the right side of said keyboard housing when said numeric keypad is coupled with said keyboard housing on its right side;
said second connector for coupling with one of said first connectors on the left side of said keyboard housing when said numeric keypad is coupled to said opening of said keyboard housing on its left side;
said second connector providing signals to said first connector when one of said keys are depressed on said numeric keypad.

12. In the improvement, as recited in claim 9, said first modular input device comprising:
a trackball;
a printed circuit board for coupling with said track ball;
a plate for coupling with said printed circuit board;
said plate having therein holes for coupling with said keyboard housing apparatus;
said plate having a second connector at its top center;
said second connector for coupling with one of said first connectors in said keyboard housing on the right side of said keyboard housing when said trackball is coupled on the right side of said keyboard housing;
said second connector for coupling with one of said first connectors in said keyboard housing on the left side of said keyboard housing when said trackball is coupled to said left side of said keyboard housing;
said second connector for providing signals to said first connector when movement is detected of said trackball.

13. A keyboard for a computer system comprising:
a keyboard housing;
a first input means for input of alphanumeric characters to said computer system, said first input means having a first connector and a second connector wherein one of said first connector or second connector is coupled to a connection means;
said first input means capable of providing a plurality of different alphanumeric characters;
a second input means for providing information to said computer system, said second input means having a third connector coupled to said connection means;
said second input means capable of providing a plurality of different input signals;
said connection means for coupling said first input means and said second input means to said computer system wherein said connection means having at least a first input connector and a second input connector;
a plurality of first coupling means for coupling said first input means and said second input means to said keyboard housing, said plurality of first coupling means spaced within said keyboard housing to allow placement of said first input means on either the right or the left-hand side of said keyboard housing;
wherein when said first input means is coupled to the right side of said keyboard housing, said first connector is coupled to said first input connector and said third connector of said second input means is coupled to said second input connector; and
when said first input means is coupled to the left side of said keyboard housing said second connector is coupled to said second input connector and said third connector of said second input means is coupled to said first input connector.

14. The keyboard as recited by claim 13 further comprising second coupling means for coupling said first input means and said second input means to said keyboard housing.

15. The keyboard as recited by claim 14 wherein said second coupling means comprises a plurality of capture ribs, said capture ribs spaced within said keyboard housing to allow coupling of said first input means on either the right or the left- hand side of said keyboard housing.

16. The keyboard as recited by claim 14 wherein said plurality of first coupling means comprises a plurality of barb snaps.

17. The keyboard as recited by claim 16 further comprising a plurality of stepped post supports.

18. The keyboard as recited by claim 16 wherein said second input means comprises a numeric keypad.

19. The keyboard as recited by claim 18 wherein said second input means comprises a track ball.

20. A computer system with a keyboard apparatus, said keyboard apparatus comprising:
a keyboard housing assembly, said keyboard housing assembly having a connection means for coupling said keyboard apparatus to said computer system;
a first modular input device having a first connector for coupling to said connection means and a second connector for coupling to said connection means;
a second modular input device having a third connector for coupling to said connection means;
fastening means for fastening said first modular input device and said second modular input device to said keyboard housing assembly; and said connection means is further comprised of a fourth connector and a fifth connector so that:
when said first connector is coupled to said fourth connector, said third connector is coupled to said fifth connector; and when said second connector is coupled to said fifth connector, said third connector is coupled to said fourth connector.

21. The keyboard apparatus as recited in claim 20 wherein said connection means if further comprised of a sixth connector, said sixth connector coupled to said fourth connector, said fifth connector and said computer system.

22. The keyboard apparatus as recited in claim 20 wherein said connection means if further comprised of:
a plurality of electrical paths, said plurality of electrical paths numbered x to y, said electrical paths forming z pair combinations;
a first electrical path group comprised of a first predetermined number of electrical path pair combinations, wherein no electrical path pair combination in said first electrical path group is in a second electrical path group; and
said second electrical path group comprised of a second predetermined number of electrical path pair combinations, wherein no electrical path pair combination in said second electrical path group is in said first electrical path group.

23. The keyboard apparatus as recited in claim 22 wherein said first electrical path group is associated with said first modular input device and said second electrical path group is associated with said second modular input device.

24. A keyboard housing for use with a computer system having increased adaptability to allow accommodation of both right-handed and left-handed users, said keyboard housing:
defining an opening for accepting a first device and a second device, said first device comprising a plurality of alphanumeric keys, a first connector and a second connector for providing input signals;
said housing further defining an external port for allowing coupling with said computer system;
said housing further defining a first internal port and a second internal port, said first internal port located substantially on a left side of said housing and providing for coupling of said first device in said opening on substantially said left side of said housing when said first connector of said first device is coupled with said first internal port and said second connector is unused, said second internal port located substantially on a right side of said housing and providing for coupling of said first device in said opening on substantially said right side of said housing when said second connector of said first device is coupled with said second internal port, said first internal port and said second internal port coupled in communication with said external port and said first connector is unused.

* * * * *